(12) United States Patent
Pack

(10) Patent No.: US 9,521,832 B1
(45) Date of Patent: Dec. 20, 2016

(54) FISHING LURE WITH SNAG GUARD

(71) Applicant: Kary Mark Pack, Mineola, TX (US)

(72) Inventor: Kary Mark Pack, Mineola, TX (US)

(*) Notice: Subject to any disclaimer, the term of this patent is extended or adjusted under 35 U.S.C. 154(b) by 62 days.

(21) Appl. No.: 13/834,077

(22) Filed: Mar. 15, 2013

Related U.S. Application Data

(60) Provisional application No. 61/761,519, filed on Feb. 6, 2013.

(51) Int. Cl.
*A01K 85/02* (2006.01)
*A01K 83/06* (2006.01)

(52) U.S. Cl.
CPC ............ *A01K 85/02* (2013.01); *A01K 83/06* (2013.01)

(58) Field of Classification Search
CPC .................. A01K 85/02; A01K 83/06
USPC ............ 43/42.4, 42.42, 42.43, 43.2, 43.4, 43.6, 43/42.39, 42.24, 44.2, 44.4, 44.6, 44.8
See application file for complete search history.

(56) References Cited

U.S. PATENT DOCUMENTS

| | | | |
|---|---|---|---|
| 1,215,938 A | 2/1917 | Jay | |
| 1,323,394 A * | 12/1919 | Jones | 43/44.8 |
| 1,806,088 A * | 5/1931 | Schnell | 43/42.43 |
| 2,364,215 A | 12/1944 | Hobson | |
| 2,604,718 A | 7/1952 | Crumb | |
| 2,982,049 A * | 5/1961 | Yost | 43/44.4 |
| 3,175,322 A | 3/1965 | Snyder | |
| D299,265 S | 1/1989 | Devereaux et al. | |
| 4,924,618 A | 5/1990 | McGahee | |
| 4,999,942 A | 3/1991 | Gills | |
| 5,274,946 A * | 1/1994 | Fusco | 43/43.2 |
| 5,809,685 A | 9/1998 | Mauldin | |
| 5,855,089 A * | 1/1999 | Hockmeyer | A01K 85/00 43/42.33 |
| 5,918,406 A | 7/1999 | Wilson | |
| 7,703,234 B2 | 4/2010 | Dodge | |
| 8,726,563 B2 * | 5/2014 | Kuhlman | 43/43.4 |
| 2004/0154212 A1 | 8/2004 | Harrell | |

* cited by examiner

*Primary Examiner* — Darren W Ark
*Assistant Examiner* — Magdalena Topolski

(57) ABSTRACT

The present invention provides embodiments of a fishing lure having a body member supporting a hook member, the hook member having a hook bite that terminates in a hook point. A flexible snag guard has a first end attached to the body member and extends from the body member at a predetermined angle. A connector flexibly connects a second end of the snag guard to the hook bite so that the snag guard shields the hook point, the snag guard movable to expose the hook point when bitten by a fish.

13 Claims, 5 Drawing Sheets

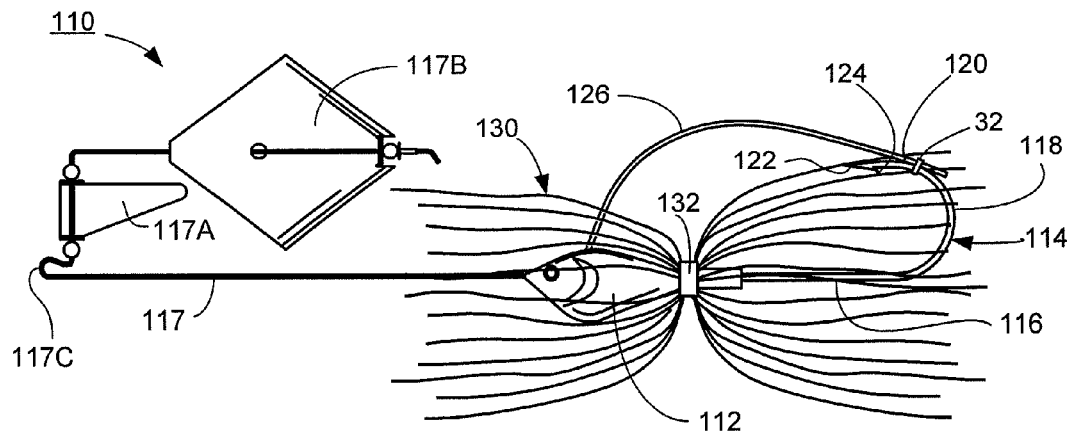
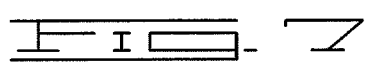
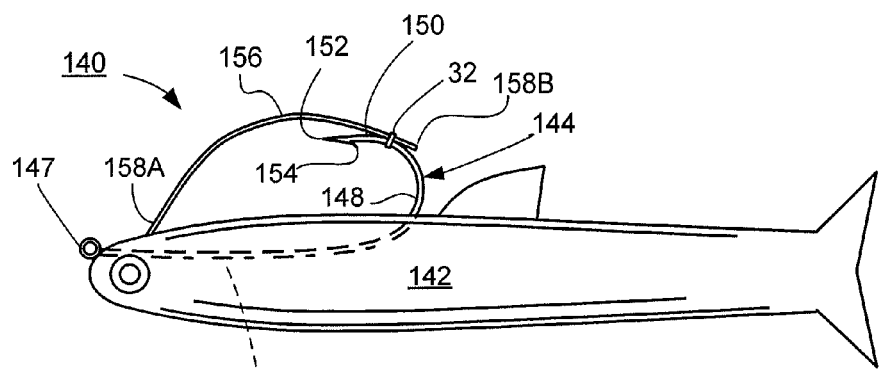
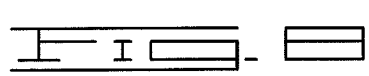

FISHING LURE WITH SNAG GUARD

RELATED APPLICATIONS

The present application makes a claim of domestic priority to U.S. Provisional Patent Application No. 61/761,519 filed Feb. 6, 2013, the contents of which are hereby incorporated by reference.

BACKGROUND OF THE INVENTION

1. Field of Invention

The present invention relates in general to fishing, and in particular but not by way of limitation, to an improved fishing lure with a snag guard.

2. Discussion

Fishing lures, used by fishermen to attract fish, are objects attached to a fishing line that are designed for underwater or surface travel to resemble the food of fish. The purpose of the lure is to use movement, vibration or color to catch the attention of fish and to have the fish bite a hook.

Lures are most usually used with a fishing rod and fishing reel. When a lure is used for casting, it is continually cast out and retrieved, the retrieve making the lure travel through the water, sometimes producing a popping action.

A skilled angler can explore many possible hiding places for fish through lure casting around and through underwater brush such as under logs and other submerged debris. The perils faced with such casting is that the lure can become entangled, and the result of such is often the loss of the lure and possible part of the fishing lines when the line is either forced free or cut loose, frequently losing the lure to its underwater resting place.

This has challenged anglers to devise means to avoid the entanglement of a lure by the provision of what is commonly called a brush or snag guard. Examples of such are taught by Jay, U.S. Pat. No. 1,215,938; Hobson, U.S. Pat. No. 2,364,215; Snyder, U.S. Pat. No. 3,175,322; McGahee, U.S. Pat. No. 4,924,618; Gariglio, U.S. Pat. No. 5,269,089; Mauldin, U.S. Pat. No. 5,809,685; Wilson, U.S. Pat. No. 5,918,406; Taibi, U.S. Pat. No. 5,974,723; and Uhrig, U.S. Publication 2008/0148623.

While there have been lures having improved weed guards, there remains to be a need for an improved fishing lure that is snag free when fishing in areas of underwater weeds, brushes or other debris in which the fishing lure hook can become entangled and unretrievable.

SUMMARY OF THE INVENTION

The present invention provides embodiments of a fishing lure snag guard having a body member that supports the shank portion of a hook that has a bite portion terminating in a sharp point. A flexible snag guard is supported by the body member and has a first end connected thereto so that the flexible snag guard extends from the body member at a predetermined support angle.

A connector flexibly connects the distal second end of the flexible snag guard to the hook bite so that the medial portion of the flexible snag guard is bowed to form a guard over the hook point to shield the hook point from snagging something as the lure is pulled through water. The flexible snag guard is rotatable to expose the hook point when a force such as a fish bite is applied to the bowed medial portion.

The advantages and features of the present invention will be apparent from the following description when read in conjunction with the accompanying drawings and appended claim.

BRIEF DESCRIPTION OF THE DRAWINGS

FIG. 1.

FIG. 7 is a side elevational view of one further embodiment constructed in accordance with the present invention and showing another spinnerbait fishing lure with the snag guard in an operational mode.

FIG. 8 is a side elevational view of another embodiment constructed in accordance with the present invention and showing a swimbait fishing lure with the snag guard in an operational mode.

DESCRIPTION OF THE INVENTION

While fishing around cover such as trees, logs, brush, rocks, boathouses, cables—any obstruction in the water that a fishing lure can hang up on, the lure and snag guard of the present invention protects the hook from hanging up under most fishing conditions. Several embodiments will be described herein, and it will be understood that the invention presents fishing lures that are substantially snag free, or that is, snagless.

Figure 1:
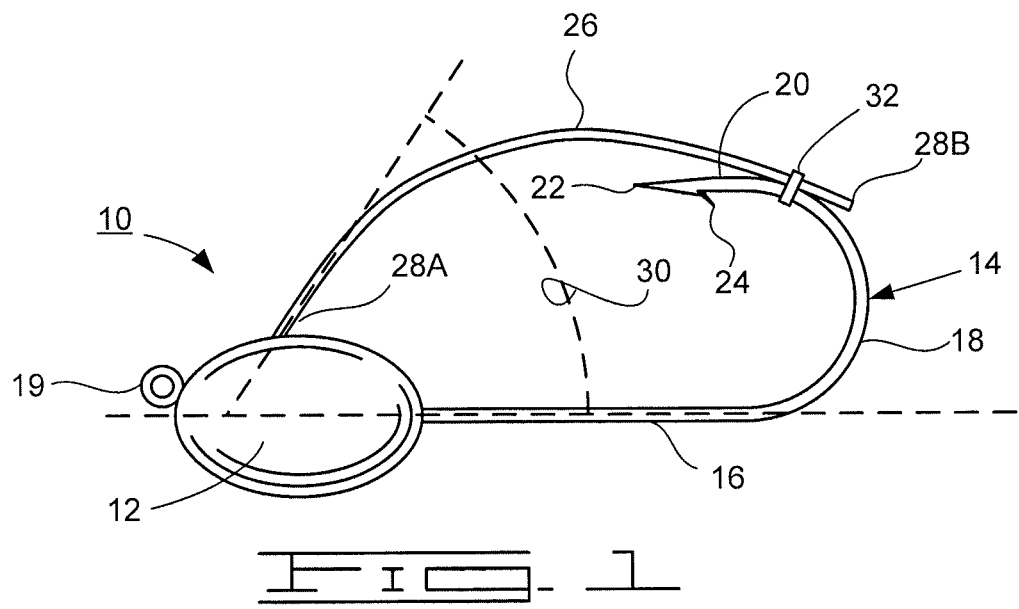
FIG. 1 is a side elevational view of an embodiment constructed in accordance with the present invention and showing a jig head fishing lure with a snag guard, the fishing lure having the snag guard in an operational mode.

FIG. 1 shows a fishing lure 10 having a body portion 12 and a hook 14 extending there from. The hook 14 has a shank 16 and a bend portion 18; the hook shank 16 extends through the body portion 12 and its end forms an exposed hook eye 19 to provide for connection to a fishing line (not shown). The hook 14 has a bite portion 20 that terminates in a sharp point 22 and a barb 24.

Figure 1A:
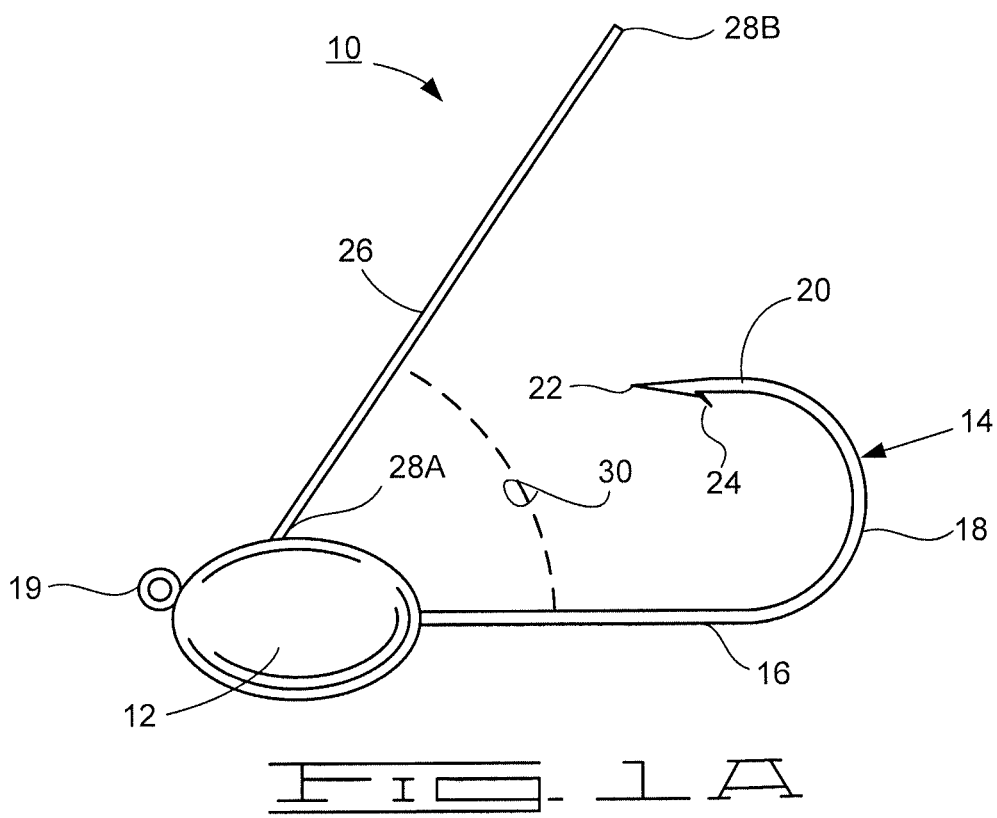
FIG. 1A shows the fishing lure of FIG. 1 with the snag guard in a non-operational mode.

A snag guard 26, as shown in FIG. 1A, is a flexible snag guard that has a first end 28A and a second end 28B; the first end 28A is secured to the body portion 12 so that the snag guard 26 extends there from at an angle 30. This attachment can be by means of a hole into which the first end 28A extends and secured therein by an appropriate adhesive. The snag guard 26 is flexed to arch toward, and connected to, the bite portion 20 by a connector 32. The angle 30 can be varied as desired to increase the bending torque in the snag guard 26 as bent and connected to the bite 20. The snag guard 26 can be made (by way of example and not by way of limitation) of flexible hard plastic, appropriate sized fishing line, weed eater line, steel or stainless steel cable.

Figure 2:
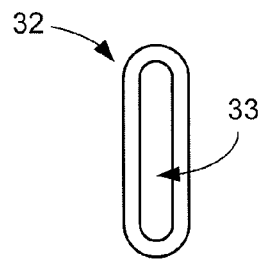
FIG. 2 is an enlarged end view of the connector member of the fishing lure of FIG. 1.

The connector 32, shown in enlarged view in FIG. 2, is preferably a flexible elastomeric (such as rubber) or polymeric band forming at least one central aperture 33 through which the flexible snag guard 26 and the bite 20 can be extended, thereby flexibly securing the snag guard 26 to arch over and protect the hook point 22 and barb 24 from being inadvertently engaged by debris or the like when the lure 10 is caused to travel through water.

Figure 3:
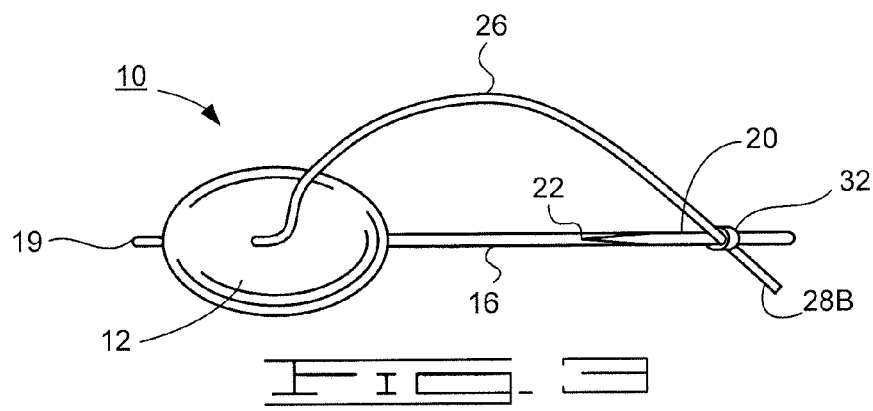
FIG. 3 is a top view of the fishing lure of FIG. 1 in the operational mode and having the snag guard flexed to one side as will occur when a fish bites onto the lure of FIG. 1 to expose the hook bite.

When bitten by a fish, the lure 10 will assume the position depicted in FIG. 3 in which the snag guard 26 is caused to flex down and away from the hook bite 20, exposing the hook point 22 to be engaged by the fish so as to be captured thereby. Should the hook 14 fail to hook the biting fish, upon being released by the fish, the snag guard 26 will flex back to the operational mode shown in FIG. 1. Thus, the lure 10 has the capability of resuming the operational mode after each failed engagement with a fish; the snag guard 26 will thereby continue to protect the hook from engagement by weeds and other underwater debris until successfully being hooked by a fish.

Figure 4:
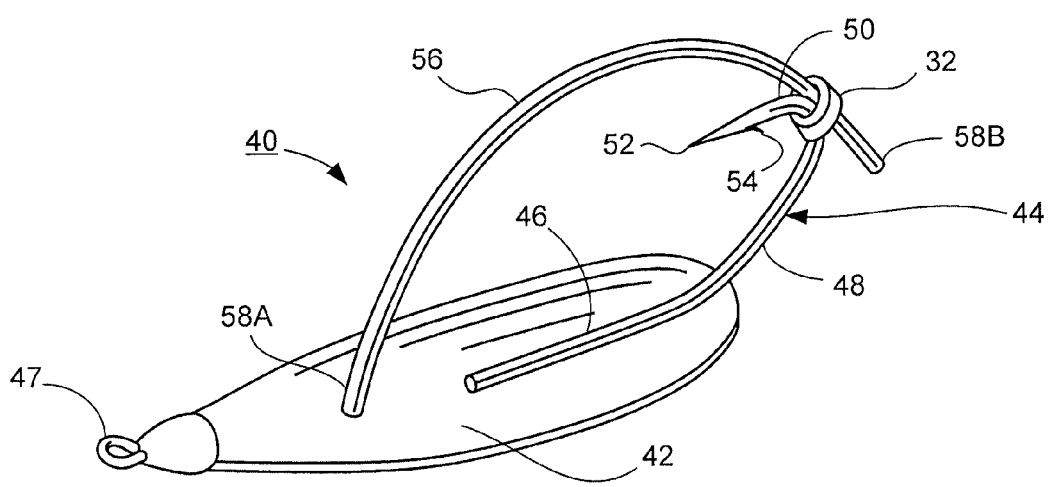
FIG. 4 is a perspective view of another embodiment constructed in accordance with the present invention and showing a spoon fishing lure with the snag guard in an operational mode.

FIG. 4 shows a spoon lure 40 having a spoon shaped body portion 42 and a hook 44. The hook 44 has a shank 46 that is adhered to the spoon portion (such as by an appropriate adhesive) to extend upwardly from one end thereof. The spoon body 42 is preferably provided an aperture line connector 47 for connection of a fishing line thereto. The hook 44 has a bend portion 48 and a bite portion 50 that terminates in a sharp point 52 and a barb 54.

A flexible snag guard 56 has a first end 58A and a second end 58B, the first end 58A secured to the spoon portion 42 (such as by an appropriately sized bore and adhesive) so that the snag guard 56 extends there from at an angle (not separately designated but preferably substantially equal to the angle 30 of FIG. 1, the angle varied as desired to provide the desired bending torque in the snag guard 56 as bent and connected to the bite 50). The snag guard 56 arches toward, and is connected to, the bite portion 50 by connector 32 (described herein above) through which the snag guard 56 and the bite 50 extend, thereby placing the snag guard 56 to arch over and protect the hook point 52 and barb 54 from being inadvertently engaged with debris and the like when the lure 40 is caused to travel through water.

Figure 5:
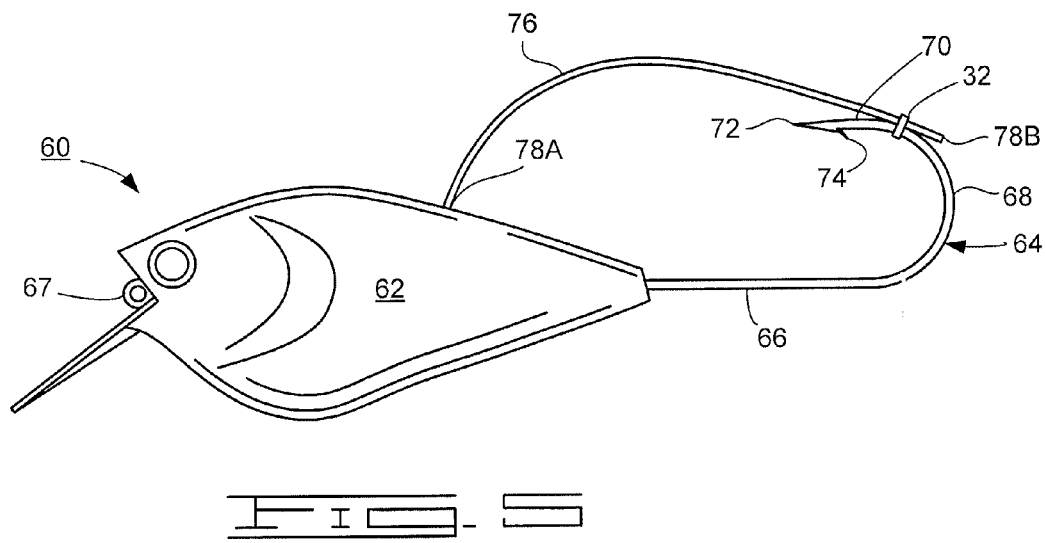
FIG. 5 is a side elevational view of yet another embodiment constructed in accordance with the present invention and showing a crankbait fishing lure with the snag guard in an operational mode.

FIG. 5 shows a crankbait lure 60 having a minnow shaped body portion 62 and a hook 64. The hook 64 has a shank 66 that is secured to the body portion 62 (such as by extension into an appropriately sized bore and secured therein by an appropriate adhesive) to extend from the tail end thereof. The body 62 is preferably provided an apertured line connector 67 at the mouth end for connection to a fishing line. The hook 64 has a bend portion 68 and a bite portion 70 that terminates in a sharp point 72 and a barb 74.

A flexible snag guard 76 has a first end 78A and a second end 78B, the first end 78A secured to the body portion 62 (such as by an appropriately sized bore and adhesive) so that the snag guard 76 extends there from at an angle (not separately designated but preferably substantially equal to the angle 30 of FIG. 1, the angle varied as desired to provide the desired bending torque in the snag guard 76 as bent and connected to the bite 70). The snag guard 76 arches toward, and is connected to, the bite portion 70 by connector 32 (described herein above) through which the snag guard 76 and the bite 70 extend, thereby placing the snag guard 76 arched over and protecting the hook point 72 and barb 74 from being inadvertently engaged with debris and the like when the crankbait 60 is pulled through water. When the crankbait 60 is bitten by a fish, the snag guard 76 will roll over to assume the position depicted by the snag guard 26 in FIG. 3.

Figure 6:
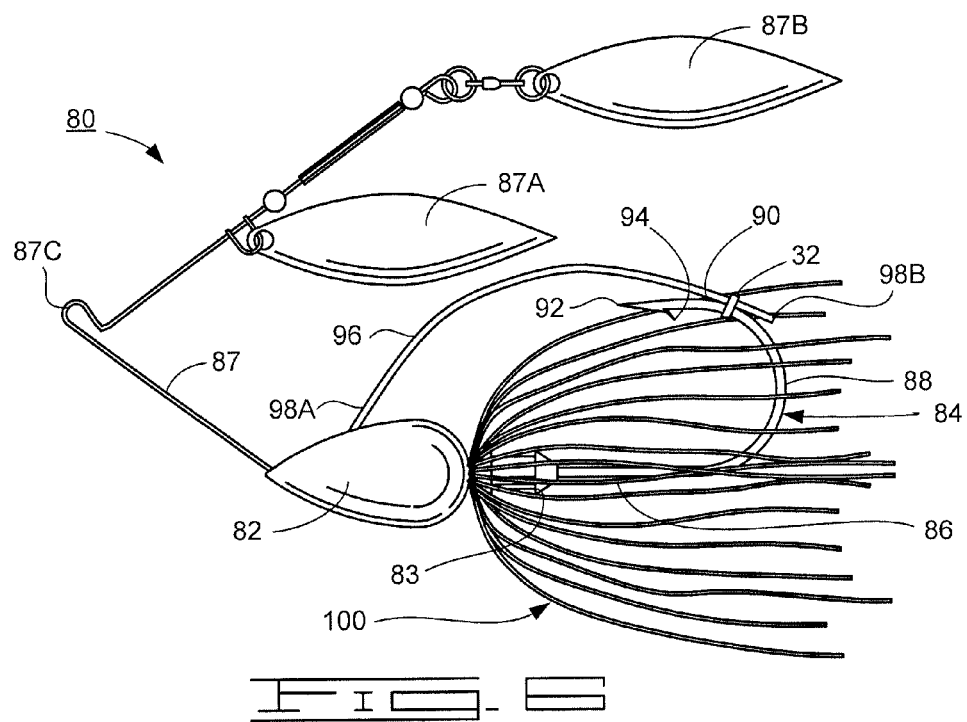
FIG. 6 is a side elevational view of one further embodiment constructed in accordance with the present invention and showing a spinnerbait fishing lure with the snag guard in an operational mode.

Turning to FIG. 6, shown therein is a spinnerbait lure 80 having a body portion 82 similar to the body portion 12 of FIG. 1, except the body 82 is generally tear shaped with a protruding rear portion 83 from which extends a hook 84. The hook 84 has a shank 86 that extends from the body portion 83 (such as from an appropriately sized bore in which the shank is secured by an appropriate adhesive). Extending from the forward end of the body 82 is forward reaching wire 87 that is shaped to support a couple of spinners 87A and 87B in the manner shown to flutter as the spinnerbait lure is pulled through water. The wire 87 is shaped to have a connecting loop 87C for connection to a fishing line.

The hook 84 has a bend portion 88 and a bite portion 90 that terminates in a sharp point 92 and a barb 94. A flexible snag guard 96 has a first end 98A and a second end 98B, the first end 98A secured to the body portion 82 (such as by an appropriately sized bore and adhesive) so that the snag guard 96 extends there from at an angle (not separately designated but preferably substantially equal to the angle 30 of FIG. 1, the angle varied as desired to provide the desired bending torque in the snag guard 96 as bent and connected to the bite 90). The snag guard 96 arches toward, and is connected to, the bite portion 90 by connector 32 (described herein above) through which the snag guard 96 and the bite 90 extend to position the snag guard 96 arched over and protecting the hook point 92 and barb 94 from being inadvertently engaged by debris or the like when the spinnerbait lure 80 is pulled through water. When the spinnerbait lure 80 is bitten by a fish, the snag guard 96 is rolled over to assume the position depicted by the snag guard 26 in FIG. 3.

The spinnerbait lure 80 preferably has a fiber skirt 100 that extends from the body 82 with a plurality of spaced apart flexible fiber members that extend rearward to partially shield the hook 84. The fiber members are preferably sufficiently flexible to be randomly waved in the fluid currents as the spinnerbait lure 80 is pulled through water.

Shown in FIG. 7 is another embodiment of a spinnerbait lure 110 that is similar in construction to that of the spinnerbait lure 80 of FIG. 6. The spinnerbait lure 110 has a body portion 112 similar to the body portion 62 of FIG. 5 in that it is generally minnow shaped; also, the spinnerbait lure 110 has a hook 114 with a shank 116 that extends rearward from the body portion 112 (such as from an appropriately sized bore in which the shank is secured by an appropriate adhesive). Extending from the forward end of the body 112 is a forward reaching wire 117 that is shaped to support a couple of spinners 117A and 117B in the manner shown. The wire 117 is shaped to have a connecting loop 117C for connection to a fishing line.

The hook 114 has a bend portion 118 and a bite portion 120 that terminates in a sharp point 122 and barb 124. A flexible snag guard 126 has a first end secured to the body portion 112 (such as by an appropriately sized bore and adhesive) so that the snag guard 126 extends there from at an angle (not separately designated but preferably substantially equal to the angle 30 of FIG. 1, the angle varied as desired to provide the desired bending torque in the snag guard 126 as bent and connected to the bite 120). The snag guard 126 arches toward, and is connected to, the bite portion 120 by connector 32 (described herein above) through which the second end of the snag guard 96 and the bite 120 extend to position the snag guard 126 arched over and protecting the hook point 122 and barb 124 from being inadvertently engaged by debris or the like when the spinnerbait 110 is pulled through water. When the spinnerbait lure 110 is bitten by a fish, the snag guard 126 is rolled over to expose the hook bite 120 to a biting fish, the snag guard 126 assuming the position depicted by the snag guard 26 in FIG. 3.

The spinnerbait 110 preferably has a fiber skirt 130 that consists of a plurality of flexible fibers that are banded at their midpoints by a flexible band 132 to the body 112, the fiber members that extending about both the body 112 and the hook 114. The fiber members are preferably sufficiently flexible to be randomly waved in the fluid currents as the spinnerbait 110 is pulled through water.

FIG. 8 shows a swimbait lure 140 having a fish or minnow shaped body portion 142 and a hook 144. The body portion is preferably made of a soft plastic or elastomeric material to have the feel and flexibility of a real fish. The hook 144 has a shank 146 that extends through the body portion 142 and has an apertured line connector 147 at the head end for connection to a fishing line. The hook 144 has a bend portion 148 and a bite portion 150 that terminates in a sharp point 152 and a barb 154.

A flexible snag guard 156 has a first end 158A and a second end 158B, the first end 158A secured to the body portion 142 (such as by an appropriately sized bore and adhesive) so that the snag guard 156 extends there from at an angle (not separately designated but preferably substantially equal to the angle 30 of FIG. 1, the angle varied as desired to provide the desired bending torque in the snag guard 156 as bent and connected to the bite 150). The snag guard 156 arches toward, and is connected to, the bite portion 150 by connector 32 (described herein above) through which the snag guard 156 and the bite 150 extend, thereby placing the snag guard 156 arched over and protecting the hook point 152 and barb 154 from being inadvertently engaged by debris and the like when the swimbait lure 140 is pulled through water. When the crankbait lure 140 is bitten by a fish, the snag guard 156 will roll over to assume the position depicted by the snag guard 26 in FIG. 3.

Figure 9:
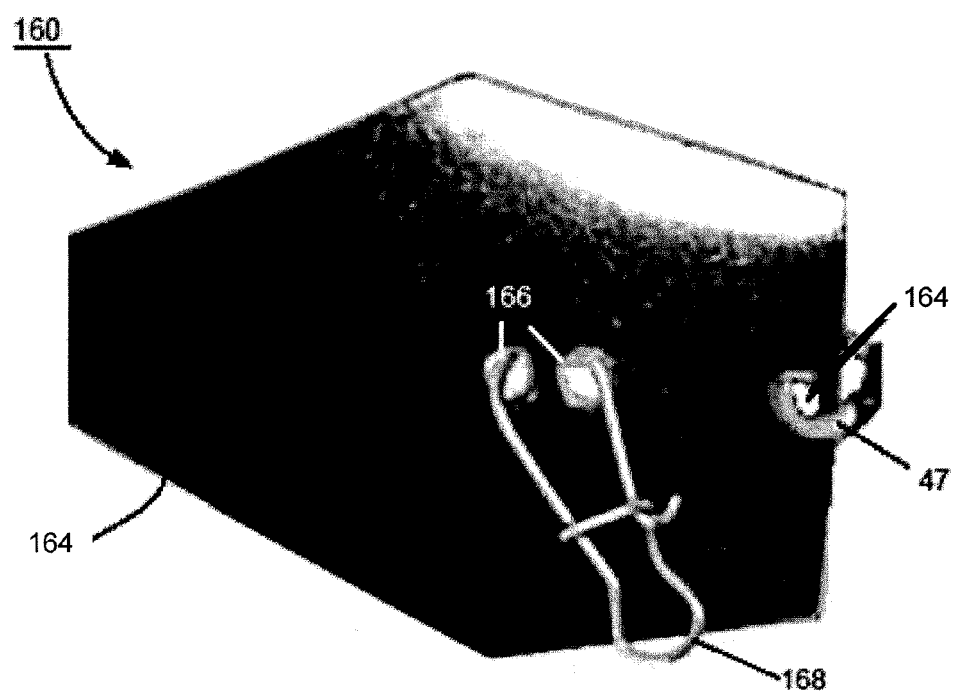
FIG. 9 is a top plan view of a vibrator blade.

FIG. 9 shows a typical vibrator blade 160 that is usable with several of the embodiments described herein. The vibrator blade 160, shown herein for the purpose of illustrating the variety of lure combinations possible, consists of a generally flat body member 162, although the body member can have various shapes such as a somewhat spoon or saucer shaped curve or with curved edges in order to increase flow resistance to increase the vibration as the vibrator blade 160 is pulled through water. The body member 162 preferably has a hole 164 near the rear edge thereof; this hole 164 serves to provide for attachment to the eye of a hook such as the aperture line connector 47 of the spoon lure 40 shown in FIG. 4. The body member 162 has a pair of line connector holes 166 to which is attached a pin connector 168 for attachment to a fishing line. The vibrator blade 160, or the like, can be attached to one of the embodiment lures disclosed herein, such as, for example, between the fishing line (not shown) and the aperture line connector 47 to convert the spoon lure 40 to a spinnerbait lure.

As described herein, the snag guard is attached to the body of the lure forward of the hook, and then is flexed down and attached to the hook by a coupling made of rubber or the like that holds the guard flexed and attached to the hook. When a fish bites the lure, the snag guard rotates to the side or collapses down in order for the hook point to penetrate the fish's mouth.

While the connector 32 is described herein as a flexible band member forming at least one central aperture 33 through which the second end of the flexible snag guard and the hook bite can be extended, thereby flexibly securing the snag guard to the hook to protect the hook point from being inadvertently engaged by debris or the like when the lure is pulled through water. An alternative embodiment for the connector is a tubular member that is welded or otherwise secured to the hook bite, the second end of the snag guard being extendible into the hollow center of the tubular member. The flexibility of the snag guard then can be determined such that the snag guard will be bowed downwardly and away from the hook point when bitten by a fish, thereby exposing the hook point to engage the mouth of the fish.

As illustrated herein by the embodiments described, the snag guard can be attached to a variety of fishing lures such as a jig head, which is a solid body head molded to a hook, usually made of either lead, tin, bismuth, tungsten or hard plastic. Other components can be added to the jig head to make it more appealing to fish, such as a vibrator blade, soft plastic in the shape of worms, crawfish and baitfish, such as brim, shad, alewife and barfish but not limited to these.

A spoon lure is usually made of steel, brass, copper, tungsten, hard plastic, tin or bismuth and flutters when pulled through water. A crankbait lure is usually made of hard plastic, wood or metal, and by adding a spinner blade, one can make a spinnerbait lure with a vibrating blade to a jig head to make it more appealing to a fish.

While fishing around cover such as trees, logs, brush, rocks, boathouses, cables—any obstruction in the water that a fishing lure can hang up on, the snag guard of the present invention protects the hook from hanging up under most fishing conditions.

It is clear that the present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. A fishing lure comprising:
a body member;
a hook member having a shank portion supported by the body member, the hook having a hook bight and a hook point;
a snag guard having a first end attached to the body member and extending from the body member; and
a flexible band surrounding the hook bight for slidably attaching a second end of the snag guard to the hook member proximate to the hook bight so that the medial portion of the snag guard guards the hook point, the snag guard exposing the hook point when a force is applied to the medial portion of the snag guard, wherein the flexible band is an elastomeric or polymeric band forming a central aperture through which the second end of the snag guard and the hook bight extend.

2. The fishing lure of claim 1 wherein the snag guard is a flexible member that is bowed between the body member and the hook bight when the second end of the snag guard is slidably attached proximate to the hook bight.

3. The fishing lure of claim 2 wherein the snag guard extends from the body member at a predetermined angle between the snag guard and the shank portion.

4. The fishing lure of claim 3 wherein the angle is variable to determine the bending torque of the snag guard when attached to the hook bight.

5. The fishing lure of claim 1 further comprising means for connecting the body member to a fishing line.

6. The fishing lure of claim 5 wherein the means for connecting the body member is formed by one end of the hook extending from the body member.

7. The fishing lure of claim 1 wherein the hook shank extends into the body member.

8. A fishing lure comprising:
a body member;
a hook member having a shank portion supported by the body member, the hook member having a hook bight that terminates in a hook point;
a flexible snag guard having a first end attached to the body member and extending from the body member, the snag guard extending at a predetermined angle between the snag guard and the hook shank portion; and
a flexible band surrounding the hook bight for slidably attaching a second end of the snag guard to the hook member proximate to the hook bight so that the snag guard guards the hook point, the snag guard movable to expose the hook point when bitten by a fish, wherein the flexible band forms a central aperture through which the second end of the snag guard and the hook bight extend.

9. The fishing lure of claim 8 wherein the angle is variable to determine the bending torque of the snag guard when slidably attached to the hook member proximate to the hook bight.

10. The fishing lure of claim 8, wherein the flexible band is made of an elastomeric or polymeric material.

11. The fishing lure of claim 10 further comprising means for connecting the body member to a fishing line.

12. The fishing lure of claim 11 wherein the means for connecting the body member is formed by one end of the hook extending from the body member.

13. The fishing lure of claim 8 wherein the hook shank extends into the body member.

* * * * *